March 6, 1951 P. D. TAYLOR 2,543,945
ADJUSTABLE PIPE AND CASING RETHREADER AND CLEANER
Filed Sept. 11, 1946
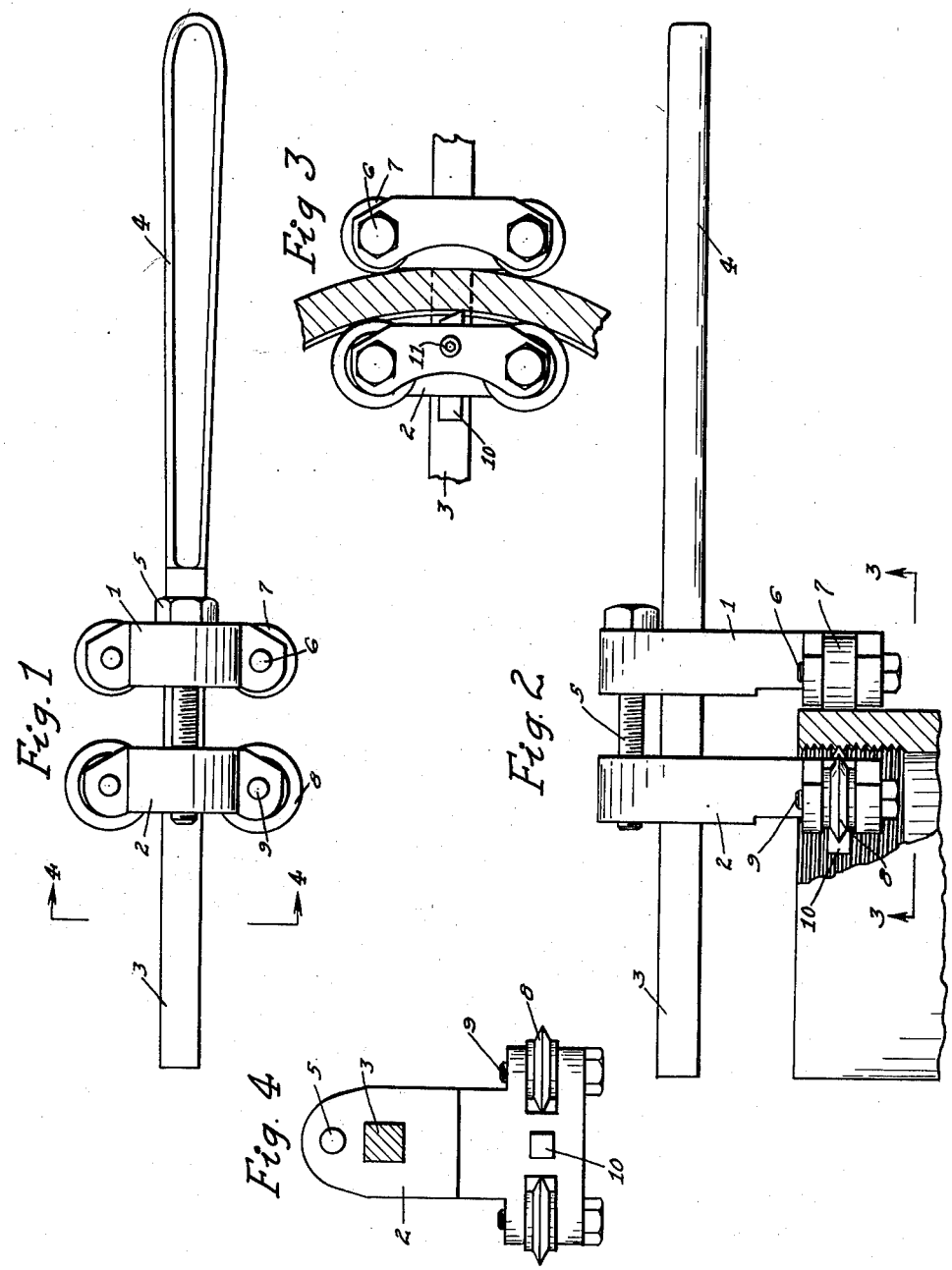
INVENTOR.
PRESTON D. TAYLOR
BY *Victor J. Evans & Co.*
ATTORNEYS Patented Mar. 6, 1951

2,543,945

UNITED STATES PATENT OFFICE 2,543,945

ADJUSTABLE PIPE AND CASING RETHREADER AND CLEANER

Preston D. Taylor, Roswell, N. Mex.

Application September 11, 1946, Serial No. 696,227

2 Claims. (Cl. 10—1)

This invention relates to improvements in pipe tools, and has for an object the provision of a tool for cleaning and renewing the threads of pipes and casings.

A further object is the provision of a tool which is adjustable and is adapted for cleaning and renewing threads of pipes and the like on both the inside and outside.

A further object is to provide a pipe tool which is simple in structure and easily adjusted to take care of pipe threads in many different situations.

A further object is the provision of an easily manipulated pipe tool which will quickly remove rust or renew damaged threads, thereby saving considerable time and expense.

These and other objects are attained by the novel construction and arrangement of parts hereinafter described and illustrated in the accompanying drawings, forming a part hereof, and in which:

Fig. 1 is a plan view of a pipe tool embodying the invention.

Fig. 2 is a side view of the tool.

Fig. 3 is a sectional view taken on the line 3—3 of Fig. 2.

Fig. 4 is a sectional view taken on the line 4—4 of Fig. 1.

Referring to the drawings, the pipe tool is shown to comprise two clamping blocks 1 and 2, having square holes through which pass the shank 3 of a handle 4, the shank 3 being square in cross section. The blocks 1 and 2 are slidable on the shank 3 and adjustably connected by a threaded bolt 5 threadedly connected to one of the blocks.

The lower portion of the clamping block 1 is provided with a pair of recesses in which are rotatably mounted on bolts 6 a pair of pusher rollers 7. Similarly, the guide block 2 is provided with recesses in which guides 8 are rotatably mounted on bolts 9.

A cutter 10, square in cross-section, is slidably mounted in a square hole in block 2, and held in fixed positions by a set screw 11.

In operation the cutter guides 8 are set into the old threads to be cleaned or renewed, and the pusher rollers 7 are set on the opposite side of the pipe as shown in Figs. 2 and 3. Cutter 10 is then set snug in the threads and the handle is turned to move the cutter through the threads to remove rust, or to renew the threads.

It will be seen that there has been provided a simple pipe tool which can be readily set in place and adjusted to quickly clean or renew the threads of pipes and casings, etc. The tool requires no special skill in its manipulation, and has few parts to get out of order.

The above description is to be considered as illustrative and not limitative of the invention of which modifications can be made without departing from the spirit and scope of the invention as set forth in the appended claims.

The invention having been described, what is claimed is:

1. A casing re-threading tool comprising a clamping block having a handle opening therethrough and having a bolt hole therein spaced from and parallel to the said handle opening, spaced transversely positioned clamping rollers rotatively mounted in the end of the clamping block opposite to that in which the handle opening is positioned, a guide block spaced from the clamping block and also having a handle opening and a bolt hole therethrough with the bolt hole therein threaded and with the bolt hole and handle opening aligned with the bolt hole and handle opening of the clamping block, respectively, laterally disposed thread guide rollers having V-shaped peripheral edges in the end of the guide block opposite to that in which the handle opening is positioned and in the same plane as that of the rollers of the clamping block, the axes of the thread guide rollers being parallel to that of the rollers of the clamping block, a thread cutting tool carried by the guide block and also in the same plane as that of the guide block and clamping rollers, the cutting end of said thread cutting tool extending into the area between the clamping and guide rollers, an extended handle mounted in the handle openings of the blocks and positioned in a plane parallel to and spaced from the plane through the guide and clamping rollers, and an adjusting bolt extended through the bolt hole of the clamping block and threaded in the said bolt hole of the guide block.

2. A casing re-threading tool comprising a clamping block having a handle opening therethrough and having a bolt hole therein spaced from and parallel to the said handle opening, spaced transversely positioned clamping rollers rotatively mounted in the end of the clamping block opposite to that in which the handle opening is positioned, a guide block spaced from the clamping block and also having a handle opening and a bolt hole therethrough with the bolt hole therein threaded and with the bolt hole and handle opening aligned with the bolt hole and handle opening of the clamping block, respectively, laterally disposed thread guide rollers having V-shaped peripheral edges in the end of the guide block opposite to that in which the handle opening is positioned and in the same plane as that of the rollers of the clamping block, the axes of the thread guide rollers being parallel to the axes of the rollers of the clamping block, a thread cutting tool carried by the guide block and also in the same plane as that of the guide block and clamping rollers, the cutting end of said thread cutting tool extending into the area between the clamping and guide rollers, an extended handle mounted in the handle openings of the blocks and positioned in a plane parallel to and spaced from the plane through the guide and clamping rollers, and an adjusting bolt extended through the bolt hole of the clamping block and threaded in the said bolt hole of the guide block, said tool adapted to be positioned on the wall of a cylindrical casing with the thread guide rollers and cutting tool positioned in threads in the inner surface of the casing and with the clamping rollers positioned against the outer surface and retaining the thread cutting tool in cutting relation with the threads.

PRESTON D. TAYLOR.

REFERENCES CITED

The following references are of record in the file of this patent:

UNITED STATES PATENTS

| Number | Name | Date |
|---|---|---|
| 1,215,121 | Cramer | Feb. 6, 1917 |
| 1,411,013 | Gilmore | Mar. 28, 1922 |
| 1,600,927 | Bryant | Sept. 21, 1926 |
| 1,773,096 | Cousineau | Aug. 10, 1930 |

FOREIGN PATENTS

| Number | Country | Date |
|---|---|---|
| 1,648 | Great Britain | May 7, 1873 |
| 61,497 | Sweden | June 2, 1924 |
| 294,892 | Germany | Oct. 31, 1916 |